United States Patent Office 3,215,673
Patented Nov. 2, 1965

3,215,673
PROCESS FOR POLYMERIZING ALDEHYDES
Bruce N. Bastian, Oakland, Calif., assignor to Shell Oil Company, New York, N.Y., a corporation of Delaware
No Drawing. Filed Oct. 30, 1961, Ser. No. 148,741
15 Claims. (Cl. 260—67)

This invention relates to the polymerization of aldehydes. More particularly, the invention relates to a new process for polymerizing aldehydes to form valuable high molecular weight crystalline polyether polymers, to the resulting products and to their utilization.

Specially, the invention provides a new and efficient process for converting aldehydes, and preferably those free of conjugated double bonds, such as, for example, acetaldehyde and halogenated acetaldehydes, to high molecular weight crystalline polyether polymers, which process comprises contacting the aldehyde with a catalyst comprising a compound of the formulae $$(AlOOY)_m$$

or

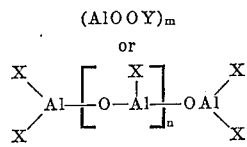

wherein Y is —R or

(wherein R is a hydrocarbon radical), X is halogen, OH, OR or OCR (wherein R is a hydrocarbon radical), and at least two X's are OR radicals, and $n$ is an integer and preferably 1 to 6, and $m$ is an integer preferably 3 to 8, under substantially anhydrous conditions and at a relatively low temperature.

It is known that saturated aldehydes, such as acetaldehyde, can be converted to high molecular weight polymers by contacting with an alkali metal alkoxide. This process, however, it is not particularly useful for commercial operations as the yields of the polymer obtained are very low.

It is, therefore, an object of the invention to provide a new process for polymerizing aldehydes. It is a further object to provide a new process for converting aldehydes to high molecular weight polymers. It is a further object to provide a process for converting aldehydes to polymers having various degrees of crystallinity. It is a further object to provide a method for preparing crystalline high molecular weight polymers of aldehydes in high yield. It is a further object to provide a new process for preparing valuable copolymers of aldehydes. It is a further object to provide a process for preparing polymers of aldehydes which are particularly useful and valuable. These and other objects of the invention will be apparent from the following detailed description thereof.

It has now been discovered that these and other objects may be accomplished by the process of the invention which comprises contacting the aldehyde with a catalyst comprising a compound of the formulae:

$$(AlOOY)_m$$

or

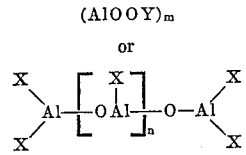

wherein Y is —R or

(wherein R is a hydrocarbon radical), X is halogen, OH, OR or —OC—R (wherein R is a hydrocarbon radical), and at least two X's are OR radicals, and $n$ is an integer of at least 1, and preferably 1 to 6, $m$ is an integer preferably 3 to 8, and preferably a compound obtained by polymerizing a hydrolyzed aluminum alkoxide, such as, for example, hydrolyzed aluminum isopropoxide, under substantially anhydrous conditions and at a relatively low temperature. It has been surprisingly found that this technique converts the aldehydes into high yields of high molecular weight polyether polymers. It has been further found that the resulting polymers have various degrees of crystallinity. The products can be utilized in many important applications as they can be pressed or molded into various plastic articles, and, depending on type of structure, can be utilized in solvent solution to form coatings, impregnating compositions and the like.

It has also been found that the stability of the above-noted aldehyde polymers can be improved by treatment of the polymers with reactants such as diazo compounds and vinyl compounds substituted with an electron withdrawing group in the vicinity of the vinyl group.

The aldehydes to be polymerized by the process of the invention include those having at least one free

group and are preferably free of conjugated double bonds. Examples of the aldehydes include, among others, formaldehyde, acetaldehyde, butyraldehyde, isobutyraldehyde, propionaldehyde, valeraldehyde, Δ5 dihydropyran carboxaldehyde, hexanal, 2-ethylhexanal, acrolein, methacrolein, crotonaldehyde, furfural, phenylacetaldehyde, monochloroacetaldehyde, dichloroacetaldehyde, trichloroacetaldehyde, cyclohexanecarboxaldehyde, methoxycyclohexanecarboxaldehyde, cyclohexenecarboxaldehyde, butoxyacetaldehyde, tetrahydrobenzaldehyde, glycidaldehyde, glyoxal and the like, and mixtures thereof. Preferred aldehydes to be employed include the aliphatic and cycloaliphatic monoaldehydes containing up to 18 carbon atoms which are free of conjugated double bonds.

The process of the invention can be used for the homopolymerization of any of the above-described aldehydes as well as the copolymerization of two or more of the said aldehydes, such as, for example, mixtures of acetaldehyde with formaldehyde, chloral, propionaldehyde, butyraldehyde, tetrahydrobenzaldehyde and the like. In making the copolymers, the proportions of the different aldehydes may vary over a wide range, such as, for example, 1% to 99% of one aldehyde to 99% to 1% of the other aldehyde. In making copolymers from acetaldehyde and other aldehydes, it is generally preferred to prepare products having at least 5% by weight of acetaldehyde, and preferably from 10% to 95% by weight of acetaldehyde.

The above-described aldehydes or mixtures of aldehydes are polymerized according to the process of the invention by contacting the aldehyde or mixtures of aldehydes with a catalyst of the formula $(AlOOY)_m$ wherein Y is an —R or

radical (wherein R is a hydrocarbon radical) and $m$ is an integer preferably 3 to 8. These compounds have cyclic structures, such as, for example:

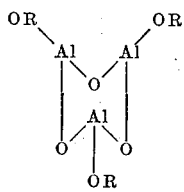

and

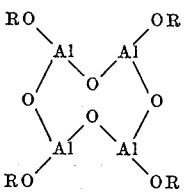

The R in the above-described formula may be aliphatic, cycloaliphatic or aromatic and may be saturated or unsaturated. Examples of such include, among others, methyl, ethyl, butyl, isopropyl, hexyl, octyl, nonyl, cyclohexyl, cyclopentyl, allyl, vinyl, phenyl, benzyl, tolyl, and the like, and mixtures thereof. R is preferably an alkyl radical containing 1 to 12 carbon atoms. Examples of the catalysts include, among others, $(AlOOCH_3)_3$, $$(AlOOC_2H_5)_4$$

$(AlOOCH_3H_7)_3$, $(AlOOCH_5H_{11})_3$, and the like.

Other catalysts to be used include those of the formula:

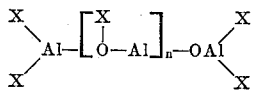

wherein X is halogen, OH, OR or

(wherein R is a hydrocarbon radical), and at least two X's are OR radicals, and $n$ is an integer of at least 1, and preferably 1 to 6. R in the above-described formula may be aliphatic, cycloaliphatic or aromatic and may be saturated or unsaturated. Examples of such radicals, include, among others, methyl, ethyl, butyl, isopropyl, isobutyl, propyl, amyl, isoamyl, hexyl, octyl, nonyl, dodecyl, octadecyl, allyl, vinyl, butenyl, cyclohexyl, cyclohexenyl, cyclopentyl, cyclopentenyl, benzyl, phenyl, tolyl, chloromethyl, chlorohexyl, methoxybutyl, and the like. R is preferably a saturated aliphatic, cycloaliphatic radical or an aromatic radical containing up to 18 carbon atoms, and still more preferably up to 8 carbon atoms.

Examples of these catalysts include, among others,

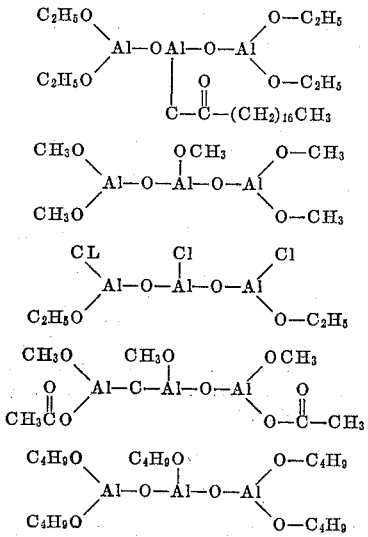

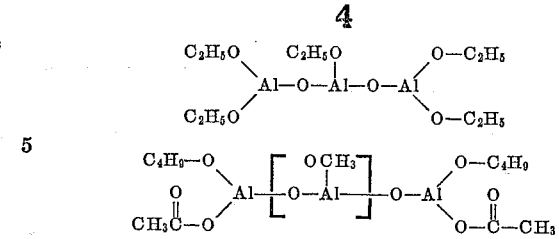

The preferred catalysts to be employed are those of the formula $(AlOOY)_3$ wherein Y is an alkyl containing 1 to 10 carbon atoms and those of the formula

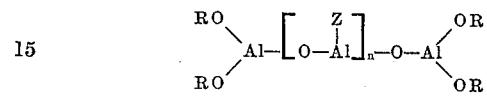

wherein Z is a OR or

wherein R is an alkyl or aryl radical containing up to 10 carbon atoms and $n$ is an integer of 1 to 6. The alkoxides used in the preparation of these compounds may be any of the simple or mixed alkoxides, such as, for example, those of formula $Al(OR)_3$, $Al(OR)(OR_1)_2$ and $Al(OR)(OR_1)(OR_2)$ wherein R, $R_1$, and $R_2$ are different hydrocarbon radicals. Examples of these include, among others, aluminum trimethoxide, aluminum triethoxide, aluminum triisopropoxide, aluminum tricyclohexyloxide, aluminum tributoxide, and aluminum dimethoxide monoethoxide, aluminum dimethoxide monobutoxide, aluminum diisopropoxide monobutoxide, and aluminum methoxide butoxide isopropoxide. Preferred alkoxides to be employed are those of the formula $Al(OR)_3$ wherein R is an aliphatic and cycloaliphatic hydrocarbon radical containing from 1 to 8 carbon atoms.

The above-described alkoxides may be converted to hydroxy or acyloxy derivatives by partial hydrolysis or partial neutralization with organic acids. Temperatures for this reaction preferably range from about 25° to 100°. The polymerization of the alkoxide derivatives as noted above is then accomplished by heating the alkoxide derivatives to about 180° C. to 260° C.

The resulting polymerized products are sensitive to water and should be kept under substantially anhydrous conditions until utilized in the process of the invention.

The amount of the above-described catalyst to be employed in the process of the invention may vary over a considerable range. Preferred amounts vary from about .1 mol to 5 mols per 100 mols of aldehyde to be polymerized. Particularly good results are obtained when one utilizes about .8 to 1.2 mols of the catalyst per 125 mols of the aldehyde.

The polymerization may be conducted in bulk or in the presence of suitable solvents or diluents. Preferred solvents include the hydrocarbon liquid materials, such as toluene, benzene, cyclohexane, and the like, and mixtures thereof. Sufficient solvent is employed so as to form a workable reaction mixture.

The reaction is conducted under substantially anhydrous conditions. This means that the reactants, reaction vessel, etc., must be substantially free of moisture. This may be accomplished by use of conventional techniques, such as heating, driers and the like.

The reaction is also preferably conducted in an inert atmosphere. This may be accomplished in high vacuum or by the use of inert gas, such as, for example, in an atmosphere of nitrogen, methane, ethane and the like.

The reaction is conducted at a relatively low temperature and preferably below −40° C. Preferred temperatures range from about −40° C. to −150° C. In the case of acetaldehyde which has a tendency to polymerize by itself at its melting point (−123.5° C.), it is preferred to operate at temperatures above −120° C. The low temperatures can be maintained by any conventional technique, such as Dry Ice baths, etc.

The pressure employed in the process may be atmospheric, superatmospheric or subatmospheric depending on that which is desired or necessary for the operation of the process.

The length of the reaction period may vary over a wide range depending on temperature, type of catalyst, etc. In most cases, the polymerization will be accomplished within about 1 to 30 hours, and preferably around 1 to 15 hours.

The polymers may be recovered from the reaction mixture or mass by any suitable means, such as precipitation, extraction, filtration and the like. It is generally preferred to take up the reaction mixture in an alcohol so as to kill the catalyst and help remove the catalyst from the polymer particles, and then filter the mixture to recover the solid polymer.

The polymers obtained by the above-described process are high molecular weight polyether polymers. These polymers contain a main chain such as

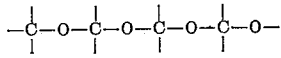

wherein the carbon atoms are attached to appropriate groups, such as hydrogen or organic radicals, depending on the aldehyde used in the polymerization. The polymers have molecular weights above about 50,000 and preferably 75,000 to 2,000,000 as determined by viscosity measurements. The molecular weights of the products may also be indicated in terms of intrinsic viscosity measurements as these are more easily determined. Preferred polymers are those having intrinsic viscosities (as determined in chloroform at 30° C.) of 0.5 dl./g. to 6.0 dl./g.

The new polymers will also have a high degree of crystallinity as determined by X-ray analysis. Crystallinity may vary up to 80% or higher.

The new polymers also have improved heat stability over polymers of aldehydes prepared by other polymerization techniques.

The stability of the polymers can be further improved by a novel feature of further reacting the polymers with certain reactive components, such as with anhydrides, ortho esters, isocyanates, and particularly with diazo compounds, such as diazomethane, and with vinyl compounds having an electron withdrawing group near the vinyl group, such as, for example, divinyl sulfone, acrylonitrile and the like. Amounts of these materials vary from about .1 part to 100 parts per 100 parts of polymer. This reaction can be conducted in the presence or absence of solvents or diluents. If the reactant is a liquid, one may use that as the reaction medium, or additional inert materials, such as toluene, benzene, dichloromethane and the like may be utilized. Temperatures employed in the reaction may vary over a wide range. Preferred temperatures range say from —40° C. to 100° C.

With the compounds as divinyl sulfone and low molecular weight alkylene oxides, improved stability is obtained by adding these materials directly to the reaction mixture before or during polymerization. Same conditions and properties as noted above apply.

The polymers of the present invention may be utilized for a variety of different applications. They can be press molded into attractive plastic articles or formed into sheets, fibers and the like. They may be used by themselves in these applications or they can be combined with various plasticizing materials, such as esters, as dioctyl phthalate, tricresyl phosphate, 1,5-pentanediol dipropionate, hexanetriol triacetate, polyethylene glycols, polypropylene glycols, glycerol, hexanetriol, glycerol tributyl ether and the like, and mixtures thereof.

The new polymers may also be blended or otherwise combined with other polymers and resins or tars and pitches. They may be combined, for example, with epoxy resins, polyurethane resins, polyamides, urea-formaldehyde and phenol resins, polythiopolymercaptans, vinyl resins, coal tar, asphalt, middle oil, coal tar pitch, and the like, in various proportions. Blending is to improve stability, workability or extend commercial applications.

The new polymers of the invention having improved solubility in solvents, such as benzene and toluene, may be utilized in the formation or surface coating compositions or impregnating compositions for paper, cloth, and the like.

To illustrate the manner in which the invention may be carried out, the following examples are given. It is to be understood, however, that the examples are for the purpose of illustration and the invention is not to be regarded as limited to any of the specific conditions or reactants cited therein. Unless otherwise indicated, parts are parts by weight.

*Example I*

This example illustrates the polymerization of acetaldehyde using aluminum oxide isopropoxide trimer

To a dry reaction flask equipped with a nitrogen inlet and outlet were added 50 parts of toluene under a nitrogen atmosphere. 12 parts of freshly distilled acetaldehyde were added via syringe and the reactor cooled to about —70° C. Aluminum oxide isopropoxide trimer (0.5 part 50% by weight in toluene) was added and the reactor shaken. Within 5 minutes gel formed and by 30 minutes the entire contents of the reactor had formed a gel. After 16 hours at —70° C. the gel was reduced to a slurry in methanol and poured into isooctane. The polymer was collected on a filter and vacuum dried for 2 hours at 50° C. The polymer was recovered in about 76% yield. The polymer had a high molecular weight and crystalline structure. Infrared spectroscopic analysis confirmed the presence of the alternating carbon-oxygen linkages in the main polymer chain. The polymer was swollen by chloroform or toluene and formed viscous solutions therewith which may be suitable for surface coatings. The above-described polymer could be pressed into attractive plastic sheets.

*Example II*

This example demonstrates the superior results obtained by the process of the invention over the results obtained by the use of known catalysts.

(A) Acetaldehyde was polymerized with aluminum oxide isopropoxide trimer by the procedure shown in Example I. The polymer was obtained in 76% yield and had excellent shelf life.

(B) The procedure shown in Example I was repeated with the exception that the catalyst employed was aluminum isopropoxide. In this case, the yield of polymer was only 12% and the product had poor heat stability.

*Example III*

This example illustrates the polymerization of acetaldehyde using bis(diisopropoxyaluminumoxy)aluminum monostearate.

To a dry reaction vessel as described in Example I were added 50 parts of dry toluene under nitrogen atmosphere. 12 parts of freshly distilled acetaldehyde were added via syringe and the reactor cooled to about —70° C. Bis(diisopropoxyaluminumoxy)aluminum monostearate (0.6 part in 2 parts of toluene) was added and the reactor stirred. At the end of 20 hours at —70° C. the polymer was recovered by treatment with methanol and isooctane as in Example I. The resulting product (6.5 parts) was a crystalline polymer which was identified as a polyether having alternating carbon and oxygen atoms in the main chain. The polymer had limited solubility in benzene and had good heat stability. The polymer could be pressed into attractive plastic sheets.

*Example IV*

Example I is repeated with the exception that the aluminum oxide isoproxide trimer is replaced with an equal amount of aluminum oxide butoxide trimer. Related results are obtained.

Example V

Example I is repeated with the exception that the temperature employed is —100° C. Related results are obtained.

Example VI

This example illustrates the use of the process for polymerizing propionaldehyde using aluminum oxide isopropoxide trimer.

To a dry reaction vessel was described in Example I were added 50 parts of dry toluene under nitrogen atmosphere. 12 parts of freshly distilled propionaldehyde were added via syringe and the reactor cooled to about —70° C. Aluminum oxide isopropoxide trimer (0.5 part 50% by weight in toluene) was added and the reactor stirred. At the end of 20 hours at —70° C., the polymer was recovered by treatment with methanol and isooctane as in Example I. The resulting product was a crystalline polymer which was identified as a polyether having alternating carbon and oxygen atoms in the main chain. The polymer had limited solubility in benzene. The polymer could be pressed into attractive plastic sheets.

Example VII

This example illustrates the use of the process of the invention in polymerizing dihydropyran carboxaldehyde.

To a dry reaction vessel as described in Example I were added 50 parts of dry toluene under nitrogen atmosphere. 12 parts of freshly distilled dihydropyran carboxaldehyde were added and the reactor was cooled to —70° C. Aluminum oxide isopropoxide trimer (0.5 part 50% by weight in toluene) was added and the reactor stirred. At the end of 20 hours at —70° C. the polymer was recovered by treatment with methanol and isooctane as in Example I. The resulting product was a crystalline high molecular weight polymer which was identified as a polyether having alternating carbon and oxygen atoms in the main chain. The polymer could be pressed into attractive plastic sheets.

Example VIII

Examples VI and VII are repeated with the exception that the catalyst employed is bis(diisopropoxyaluminumoxy)aluminum monostearate. Related results are obtained.

Example IX

Examples VI and VII are repeated with the exception that the catalyst employed is aluminum oxide amyloxide trimer. Related results are obtained.

Example X

Example I was repeated with the exception that the acetaldehyde was replaced with a 50–50 mixture of acetaldehyde and propionaldehyde. The resulting product obtained in 57% conversion was a high molecular weight crystalline copolymer of 71% acetaldehyde and 29% propionaldehyde which could be pressed into attractive plastic films.

Example XI

Example I is repeated with the exception that the acetaldehyde is replaced with a 50–50 mixture of acetaldehyde and dihydropyrancarboxaldehyde. The resulting product is a high molecular weight crystalline copolymer.

Example XII

The polymer shown in Example I is reacted with acetic anhydride. Products having improved heat stability are obtained.

Example XIII

Polyacetaldehyde (250 parts) produced in Example I and diazomethane (13 parts) in dichloromethane (7500 parts) and ether (1500 parts) were held at —17° C. to 25° C. for 16 hours. Unreacted diazomethane and solvents were removed under reduced pressure. After vacuum drying 245 parts of polymer were recovered. The product had improved stability.

Using 300 parts of polyacetaldehyde at 82 parts diazomethane a 7-fold increase in stability was achieved.

Example XIV

A dry reactor was charged with 100 parts of polyacetaldehyde as prepared by Example XVI, 2500 parts of toluene, 50 parts of divinyl sulfone and 1 part of sodium hydroxide. After 24 hours the polymer solution was washed with water and the polymer was precipitated by addition of isooctane. After vacuum drying the polymer, the product had increased stability by a factor 1.7 to 7.4 times.

Example XV

Example III is repeated with the exception that the bis(diisopropoxyaluminumoxy)aluminum monostearate is replaced by each of the following: bis(diisopropoxyaluminumoxy)aluminum monooleate, bis(diisopropoxyaluminumoxy)aluminum monodecanoate; and bis(dibutoxyaluminumoxy)aluminum monoheptanoate. Related results are obtained.

Example XVI

Example III was repeated with the exception that the bis(diisopropoxyaluminumoxy)aluminum monostearate was replaced the cyclic compound having the structure

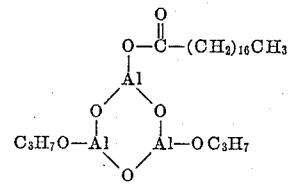

Related results were obtained.

Example XVIII

Example I was repeated with the exception that .1 mol of divinyl sulfone was added to the reaction mixture. 78% of the resulting high molecular weight polymer was stabilized by a factor of 3.9 times.

Example XVIII

Example I was also repeated with the exception that .1 mol of ethylene oxide was added to the reaction mixture. About 60% of the resulting high molecular weight polymer was stabilized by a factor of 20 times.

I claim as my invention:

1. A process for polymerizing aldehydes of the group consisting of acetaldehyde, monochloroacetaldehyde, dichloroacetaldehyde, trichloroacetaldehyde, propionaldehyde, dihydropyran carboxaldehyde and mixtures of the foregoing to form high molecular weight crystalline polymers which comprises contacting the aldehyde with a catalyst of the group consisting of

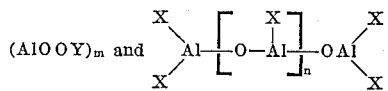

wherein Y is a member of the group consisting of $-R_1$ and

radicals wherein $R_1$ is an alkyl radical containing from 1 to 12 carbon atoms, X is a member of the group consisting of halogen, OH, OR and

radicals wherein R is a hydrocarbon radical containing from 1 to 18 carbon atoms, $m$ is an integer of 3 to 8 and $n$ is an integer of 1 to 6, under substantially anhydrous conditions and at a temperature below about 40° C.

2. A process for polymerizing monoaldehydes of the group consisting of acetaldehyde, monochloroacetaldehyde, dichloroacetaldehyde, trichloroacetaldehyde, propionaldehyde, dihydropyran carboxaldehyde and mixtures of the foregoing to form high molecular weight crystalline polymers which comprises contacting the aldehyde with aluminum oxide alkoxide trimer under substantially anhydrous conditions and at a temperature below about −40° C.

3. A process as in claim 2 wherein the monoaldehyde is acetaldehyde.

4. A process as in claim 2 wherein the monoaldehyde is propionaldehyde.

5. A process as in claim 2 wherein the monoaldehyde is dihydropyran carboxaldehyde.

6. A process as in claim 2 wherein the catalyst comprises aluminum oxide isopropoxide trimer.

7. A process as in claim 2 wherein the catalyst comprises aluminum oxide butoxide trimer.

8. A process as in claim 2 wherein the catalyst is employed in an amount ranging from about .1 to 5 mols per 100 mols of aldehyde.

9. A process as in claim 2 wherein the polymerization is conducted at a temperature ranging from about −40° C. to −150° C.

10. A process for preparing high molecular weight polymer of acetaldehyde which comprises contacting the acetaldehyde in a hydrocarbon solvent solution with aluminum oxide isopropoxide trimer in an amount of .1 to 5 mols per 100 mols of acetaldehyde, and under substantially anhydrous conditions, at a temperature of −50° C. to −100° C.

11. A process for polymerizing acetaldehyde to form high molecular weight crystalline polymers which comprises contacting the acetaldehyde with a bis(dialkoxyaluminumoxy)aluminum monoalkanoate, under substantially anhydrous conditions at a temperature below about −40° C.

12. A process as in claim 11 wherein the catalyst is bis(diisopropoxyaluminumoxy)aluminum monostearate.

13. A process as in claim 11 wherein the aldehyde is acetaldehyde.

14. A process for preparing high molecular weight copolymers of acetaldehyde and a dissimilar aldehyde of the group consisting of monochloroacetaldehyde, dichloroacetaldehyde, trichloroacetaldehyde, propionaldehyde, and dihydropyran carboxaldehyde which comprises contacting the mixture of aldehydes with a catalyst of the group consisting of

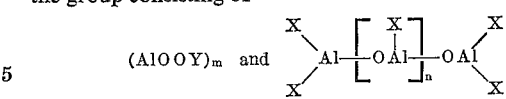

wherein Y is a member of the group consisting of —$R_1$ and

radicals wherein $R_1$ is an alkyl radical containing from 1 to 12 carbon atoms, $n$ is an integer of 1 to 6, X is a member of the group consisting of halogen, OH, OR and $$-\overset{\overset{O}{\|}}{O}CR$$

radicals wherein R is a hydrocarbon radical containing from 1 to 18 carbon atoms under substantially anhydrous conditions and at a temperature below −40° C.

15. A process as in claim 14 wherein the catalyst is aluminum oxide isopropoxide trimer.

References Cited by the Examiner

UNITED STATES PATENTS

| | | | |
|---|---|---|---|
| 2,679,498 | 5/54 | Seven et al. | 260—67 |
| 2,739,972 | 3/56 | Abbott et al. | 260—2 |
| 2,848,437 | 8/58 | Langsdorf et al. | 260—67 |
| 3,017,389 | 1/62 | Langsdorf et al. | 260—67 |
| 3,054,816 | 9/62 | Rinse | 260—448 |
| 3,058,922 | 10/62 | Vandenberg | 260—2 |
| 3,135,705 | 6/64 | Vandenberg | 260—2 |

FOREIGN PATENTS 876,956   9/61   Great Britain.

OTHER REFERENCES

Natta et al., Accademia Nazionale dei Lincei, Serie VIII, vol. XXIII, pp. 8–17, Jan. 1960 (a collection of the original papers vol. VI, Section 191).

Furukawa et al., Die Makromolekulare Chemie, vol. 44, Mar. 1961, pp. 398–407.

Kern et al., Angewandte Chemie, vol. 73, No. 6, Mar. 1961, pp. 177–224.

Derwent, Belgian Patents Report, vol. 1, No. 78A, page C10, May 1961.

WILLIAM H. SHORT, *Primary Examiner.*

LOUISE P. QUAST, *Examiner.*